(12) United States Patent
Takahashi

(10) Patent No.: US 6,477,292 B1
(45) Date of Patent: Nov. 5, 2002

(54) REFLECTION MIRROR TYPE OPTICAL FIBER SWITCH

(75) Inventor: Mitsuo Takahashi, Matsudo (JP)

(73) Assignee: Seikoh Giken Co., Ltd., Chiba-ken (JP)

( * ) Notice: Subject to any disclaimer, the term of this patent is extended or adjusted under 35 U.S.C. 154(b) by 33 days.

(21) Appl. No.: 09/657,465

(22) Filed: Sep. 7, 2000

(30) Foreign Application Priority Data

Sep. 7, 1999 (JP) .......................................... 11-252866

(51) Int. Cl.[7] ................................................ G02B 6/26
(52) U.S. Cl. ........................................ 385/18; 385/119
(58) Field of Search .............................. 385/16, 17, 18, 385/19, 33, 34, 119

(56) References Cited

U.S. PATENT DOCUMENTS

| | | | |
|---|---|---|---|
| 4,304,460 A | 12/1981 | Tanaka et al. ................. | 385/22 |
| 4,753,504 A | 6/1988 | Kyogoku ..................... | 359/217 |
| 5,000,543 A | 3/1991 | Watanabe et al. ............. | 385/18 |
| 5,742,712 A | 4/1998 | Pan et al. ...................... | 385/18 |
| 5,838,847 A * | 11/1998 | Pan et al. ...................... | 385/18 |
| 6,205,267 B1 * | 3/2001 | Aksyuk et al. ................ | 385/19 |

FOREIGN PATENT DOCUMENTS

| | | | |
|---|---|---|---|
| JP | 55021077 | 2/1980 | |
| JP | 55081307 | 6/1980 | |
| JP | 56024304 | 3/1981 | |
| JP | 63106716 | 5/1988 | |
| JP | 3-236014 | * 10/1991 | .................. 385/18 |

* cited by examiner

*Primary Examiner*—Huy Mai
(74) *Attorney, Agent, or Firm*—Venable; Catherine M. Voorhees

(57) ABSTRACT

A small reflection mirror type optical fiber switch solves a problem of an inconsistent angle of a shutter operating position in a conventional reflection mirror type optical fiber switch. A reflection mirror type 2×2 optical fiber switch includes a first collimator lens assembly $C_1$ having a pair of optical fibers disposed symmetrically with respect to an optical axis of a lens, and a second collimator lens assembly $C_2$ having a pair of optical fibers also disposed symmetrically with respect to an optical axis of a lens. In an aligning block B, the first and second collimator lens assemblies are opposed and supported, with their optical axes aligned. A driving means MO moves a mirror of a reflection mirror assembly between a position where light is reflected and a position where light is transmitted.

10 Claims, 6 Drawing Sheets

XY~XY

XY~XY

PRIOR ART

REFLECTION MIRROR TYPE OPTICAL FIBER SWITCH

BACKGROUND OF THE INVENTION

1. Field of the Invention

The present invention relates to an optical fiber switch employed with an optical fiber communication system or the like and, more particularly, to an improvement in a reflection mirror type optical fiber switch adapted to extend or retract a reflection mirror to or from a gap between a pair of opposing collimator lenses equipped with optical fibers so as to perform switching and coupling of optical fiber circuits.

2. Description of the Related Art

A 2×2 optical fiber switch disclosed under a title "Efficient electromechanical optical switches" (U.S. Pat. No. 5,742,712) belongs to the same category of the aforesaid reflection mirror type optical fiber switch. Referring to FIG. 10 and FIG. 11, a configuration of the foregoing conventional reflection mirror type 2×2 optical fiber switch will be described. The switch employs collimator lenses 1 and 2, and a reflection mirror 3. For the rod lenses 1 and 2, SELFOC lens (SFL; a trade name), which has been developed and commercialized by Nippon Sheet Glass Co., Ltd. and is commercially available, may be used.

FIG. 10 illustrates the reflection mirror inserted between the collimator lenses of the switch, and FIG. 11 illustrates a state wherein the reflection mirror has been removed from an optical path. The switch is a reflection mirror type 2×2 optical fiber switch constructed using the collimator lenses 1 and 2, and the reflection mirror 3. For the rod lenses 1 and 2, SELFOC lens (SFL) developed and commercialized by Nippon Sheet Glass Co., Ltd. and has been commercially available may be used. Optical characteristics, technical information, and typical applications of SELFOC lens have been released from Nippon Sheet Glass Co., Ltd. The foregoing type of switch has been extensively used in an optical wavelength demultiplexer/multiplexer (WDM), an optical splitter, various optical fiber switches, etc.

Referring to FIG. 10 and FIG. 11, the rod lenses 1 and 2 having a reference length of 0.25 pitch are disposed so that they oppose each other, with optical axes thereof aligned and a small gap provided between end faces thereof. The reflection mirror 3 is disposed so that it may be repeatedly moved into or out of the gap between the rod lenses 1 and 2 at right angles with respect to the optical axes. Reference characters $F_1$, $F_2$, $F_3$, and $F_4$ denote optical fibers installed to ferrules or sleeves (not shown) and assembled so that they are positioned symmetrically with the same amount of eccentricity from the optical axes of the rod lenses 1 and 2.

FIG. 10 shows the reflection mirror 3 that has been inserted between the rod lenses 1 and 2. In this case, light of a very small mode field that is emitted from the optical fiber $F_1$ turns into a parallel beam having a mode field that has been expanded through the rod lens 1, and reaches the reflection mirror 3. The parallel beam is reflected by the reflection mirror 3 and turned into light having a reduced mode field through the rod lens 1 before being incident on the optical fiber $F_2$.

Similarly, light of a very small mode field that is emitted from the optical fiber $F_3$ turns into a parallel beam having a mode field that has been expanded through the rod lens 2, and reaches the reflection mirror 3. The parallel beam is reflected by the reflection mirror 3 and turned into light having a reduced mode field through the rod lens 2 before being incident on the optical fiber $F_4$.

FIG. 11 illustrates the state wherein the reflection mirror 3 has been removed from the gap between the rod lenses 1 and 2. In this case, light of a very small mode field that is emitted from an optical fiber of the optical fiber assembly $F_1$ turns into a parallel beam having a mode field that has been expanded through the rod lens 1, then enters and passes through the rod lens 2 to become light of a reduced mode field before entering an optical fiber of the optical fiber assembly $F_4$. Similarly, light of a very small mode field that is emitted from an optical fiber of the optical fiber assembly $F_3$ turns into a parallel beam having a mode field that has been expanded through the rod lens 2, then passes through the rod lens 1 to become light of a reduced mode field before entering an optical fiber of the optical fiber assembly $F_2$. Hence, a circuit of the optical fiber $F_1$ can be alternately coupled to a circuit of the optical fiber $F_2$ or the optical fiber $F_4$ by moving the reflection mirror 3 in or out. Similarly, a circuit of the optical fiber $F_3$ can be alternately coupled to a circuit of the optical fiber $F_2$ or the optical fiber $F_4$ by moving the reflection mirror 3 in or out.

The conventional 2×2 optical fiber switch set forth above has a simple construction, but poses the following problems:

(1) Insertion loss values present a repeatability problem and are susceptible to external influences, such as vibrations and shocks.

(2) Prone to malfunction from magnetic induction under the influences of external magnetic fields.

(3) Poses a structural problem in reducing a size of a switch package to a particular size, namely, a height of 8.5 mm or less to be applicable to a ½ inch printed circuit board.

The problem with the insertion loss values is caused by inconsistent stop positions of the reflection mirror 3. This problem will be described in detail with reference to FIG. 9.

When an angle error $\sigma\theta$ with respect to a plane at right angles to an optical axis ZZ of the reflection mirror 3 occurs, a reflection angle of a parallel beam that has been transmitted through the rod lens 1 from the optical fiber assembly $F_1$ and reflected by the reflection mirror 3 will be smaller by $-2\sigma\theta$. As a result, the parallel beam is emitted to a point decentered inward from an optical axis of the optical fiber assembly $F_2$, leading to the occurrence of an insertion loss attributable to a dislocated axial center. Similarly, a reflection angle of a parallel beam that has been transmitted through the rod lens 2 from the optical fiber assembly $F_3$ and reflected by the reflection mirror 3 will be larger by $+2\sigma\theta$. The parallel beam is emitted at a point Q decentered outward from an optical axis of the optical fiber $F_2$, resulting in an increased insertion loss.

According to calculated values, if a rod lens having an outside diameter of 2 mm and a pitch of 0.25 are used, two single-mode optical fibers are decentered 0.0065 mm from an optical axis of the rod lens, and a wavelength of 1310 nm is used, then an optical insertion loss will be approximately 1 dB ($\approx-20\%$) when an optical squareness error is as follows: $\sigma\theta=0.024°$. Incidentally, the squareness error is extremely small (tan $0.024°\approx0.00042$); therefore, if variations in a mechanical position of repeated insertion of the reflection mirror 3 exceed 0.024°, then variations in optical insertion loss will be approximately 1 dB ($\approx-20\%$). If the reflection mirror moves due to external forces, such as vibrations or shocks, when the reflection mirror is inserted between the rod lenses, then similar optical insertion loss will incur variations of approximately 1 dB ($\approx-20\%$).

In the optical switch disclosed in U.S. Pat. No. 5,742,712, to drive a reflection mirror, the reflection mirror is installed on a distal end of a swing arm attached to a movable piece of a seesaw electric relay. By switching a polarity of current supplied to the seesaw electric relay, a reflection mirror surface at the distal end of the swing arm provided with the reflection mirror is moved into or out of the gap between rod lens surfaces so as to perform switching. This structure in which the reflection mirror is installed on the distal end of the swing arm attached to the movable piece retained by a very small magnetic force of the seesaw electric relay has limitation in reducing size and weight. Furthermore, it is presumed that assembly and adjustment is extremely difficult.

Regarding the shortcoming described in (1) above, it is presumed that the repeatability of accurate positioning of the reflection mirror is extremely deteriorated, and that the optical switch is extremely susceptible to external forces, including vibrations and shocks.

Regarding the shortcoming described in (2) above, in the case of a reflection mirror type optical fiber switch in a patent example, a small electromagnetic solenoid and an electric relay using a permanent magnet are employed as a drive source of the reflection mirror. It has been reported that there is a possibility of a movable piece being moved with resultant malfunction if subjected to an intense external magnetic field.

Regarding the shortcoming described in (3) above, reducing a volume is limited in obtaining a required driving force by the electromagnetic solenoid and the electric relay using a permanent magnet. This means that it is difficult to house the device in a package having a height of 8.5 mm or less from a viewpoint of design. Incidentally, it is mentioned in the foregoing patent example that the height of the package of the reflection mirror type optical fiber switch is 20 mm.

SUMMARY OF THE INVENTION

Accordingly, an object of the present invention is to provide a reflection mirror type optical fiber switch that has solved the problems with the conventional reflection mirror type optical fiber switch described above. To be more specific, the reflection mirror type optical fiber switch in accordance with the present invention is intended to:

(1) exhibit smaller insertion loss values, provide stable repeatability, and resist external forces, such as vibrations or shocks;

(2) minimize chances of malfunction caused by external magnetic induction; and (3) be able to be mounted on a ½ inch printed circuit board, a height of a package being 8.5 mm or less.

In other words, an object of the present invention is to provide a reflection mirror type optical fiber switch that satisfies the three requirements listed above.

To this end, according to one aspect of the present invention, there is provided a reflection mirror type 2×2 optical fiber switch, comprising a first collimator lens assembly $C_1$ having a pair of optical fibers $F_1$ and $F_2$ disposed symmetrically with respect to an optical axis of a lens, a second collimator lens assembly $C_2$ having a pair of optical fibers $F_3$ and $F_4$ disposed symmetrically with respect to an optical axis of a lens, an aligning block B in which the first and second collimator lens assemblies are opposed each other with their optical axes aligned, and supported so that the optical fiber $F_1$ and the optical fiber $F_4$ are optically coupled and the optical fiber $F_2$ and the optical fiber $F_3$ are optically coupled, a reflection mirror assembly formed by a reflection mirror shaft rotatably installed in a shaft hole provided in parallel to an optical axis of the lens in the aligning block, a reflection mirror provided on the reflection mirror shaft so that the reflection mirror can move between a first position where the reflection mirror reflects light from the optical fibers to focal surfaces of the lenses at right angles to the optical axes of the lenses and a second position where the reflection mirror causes the light from the optical fibers to directly enter the focal surfaces of the lenses, and defining means for defining a position of the reflection mirror at the first position by using the aligning block as a reference, and driving means for driving the reflection mirror.

Each of the first and second collimator lens assemblies is formed of a pair of optical fibers, a ferrule supporting the optical fibers, and a rod lens of about 0.25 pitch which is coupled to the optical fibers and an end of the ferrule.

The driving means employs a micro motor wherein a portion to be engaged with the reflection mirror assembly is provided in an end of a rotating shaft.

The reflection mirror uses a metal, such as stainless steel, as a material thereof, and both surfaces of the metal are provided with Ti—N coating of a hardness of MHv 1800 or more and coated with a film having high reflectivity, such as gold (Au) or platinum (Pt), by sputtering or chemical plating.

A permanent magnet in the vicinity of or in contact with the rotating shaft of the reflection mirror is buried in the aligning block to provide a self-holding mechanism at an end of a rotational angle of the reflection mirror.

To this end, according to one aspect of the present invention, there is provided a reflection mirror type 1×2 optical fiber switch, comprising a first collimator lens assembly $C_1$ in which a pair of optical fibers $F_1$ and $F_2$ is disposed in parallel symmetrically with respect to an optical axis of a lens, with a predetermined gap d being maintained therebetween, a second collimator lens assembly $C_2$ in which a single optical fiber $F_4$ is disposed in parallel to an optical axis of a lens, with a gap d/2 from the optical axis being maintained, an aligning block B in which the first and second collimator lens assemblies are opposed to each other with their optical axes aligned, and supported so that the optical fiber $F_1$ and the optical fiber $F_4$ are optically coupled, a reflection mirror assembly formed by a reflection mirror shaft rotatably installed in a shaft hole provided in parallel to an optical axis of the lens in the aligning block, a reflection mirror provided on the reflection mirror shaft so that the reflection mirror can move between a first position where the reflection mirror reflects light from the optical fibers to focal surfaces of the lenses at right angles to the optical axes of the lenses, and a second position where the reflection mirror causes the light from the optical fibers to directly enter the focal surfaces of the lenses, and defining means for defining a position of the reflection mirror at the first position by using the aligning block as a reference, and driving means for driving the reflection mirror.

To this end, according to one aspect of the present invention, there is a reflection mirror type 1×1 optical fiber switch, comprising in a reflection mirror type optical fiber switch having a collimator lens assembly formed by a pair of the optical fibers disposed symmetrically with respect to an optical axis of a lens, and a reflection mirror set at a focal position of the lens and moved between a first position for making connection from one optical fiber to another optical fiber, and a second position where the reflection mirror is retracted from the focal position, an aligning block supporting the collimator lens assembly and the reflection mirror, a reflection mirror assembly formed by a reflection mirror shaft rotatably installed in a shaft hole provided in the block in parallel to the optical axis of the lens, a reflection mirror provided on the reflection mirror shaft and extended to or retracted from image forming surfaces of the optical fibers at right angles to the optical axes of the lenses, and defining means for defining position of the reflection mirror at the first position based on the aligning block, and driving means for driving the reflection mirror.

The defining means is formed by a plane formed at right angles to an optical axis of the lens mounted on the aligning block, and a reflection mirror or a flange that rotates in slidable contact with the plane.

DESCRIPTION OF THE PREFERRED EMBODIMENTS

Referring to the accompanying drawings, an embodiment of a reflection mirror type 2×2 optical fiber switch in accordance with the present invention will be first described. The reflection mirror type optical fiber switch in accordance with the present invention can be embodied also in versions 1×2 and 1×1, as it will be discussed hereinafter.

Figure 1:
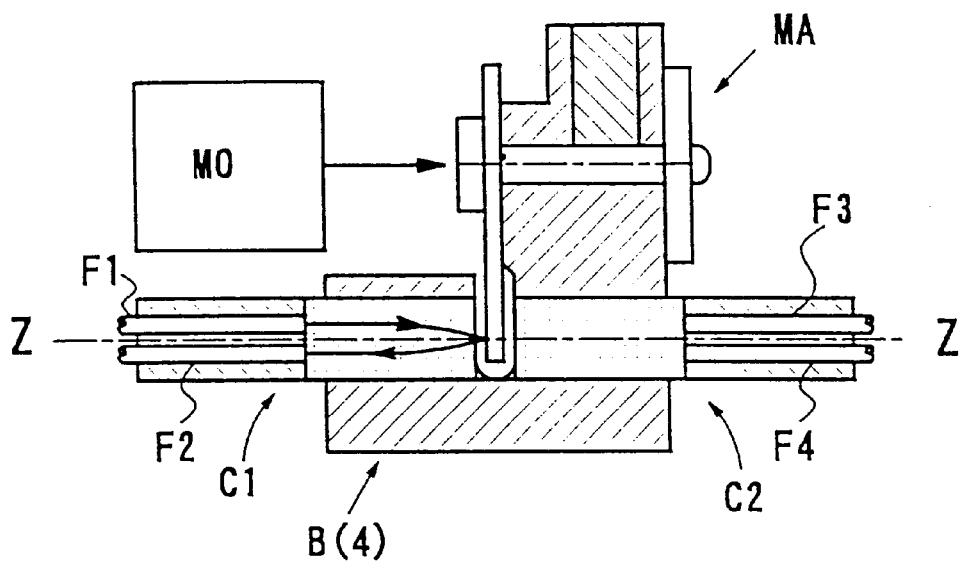
FIG. 1 is a schematic top plan view showing an embodiment of a reflection mirror type 2×2 optical fiber switch in accordance with the present invention, wherein optical fibers $F_1$ and $F_2$ are in connection, and $F_3$ and $F_4$ are in connection.
Figure 2:
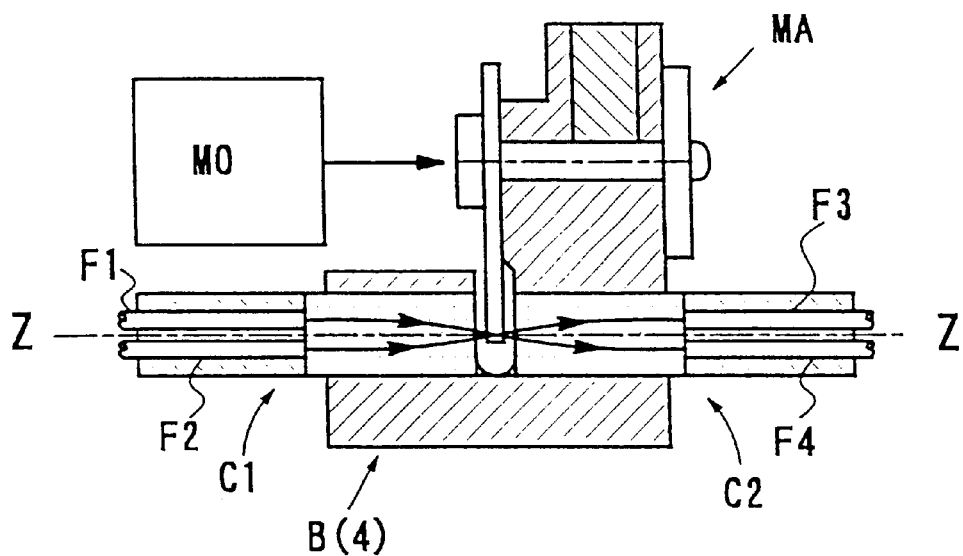
FIG. 2 illustrates a state wherein the optical fibers $F_1$ and $F_4$ are in connection, and $F_2$ and $F_3$ are in connection in the embodiment.

FIG. 1 is a schematic top plan view showing an embodiment of a reflection mirror type 2×2 optical fiber switch in accordance with the present invention, wherein optical fibers $F_1$ and $F_2$ are in connection, and $F_3$ and $F_4$ are in connection. FIG. 2 illustrates a state wherein the optical fibers $F_1$ and $F_4$ are in connection, and $F_2$ and $F_3$ are in connection in the embodiment. The optical fibers $F_1$ and $F_2$ are coupled to a first collimator lens symmetrically with respect to an optical axis thereof, constituting a first collimator lens assembly $C_1$. The optical fibers $F_3$ and $F_4$ are coupled to a second collimator lens symmetrically with respect to an optical axis thereof, constituting a second collimator lens assembly $C_2$. These collimator lens assemblies $C_1$ and $C_2$ are supported by an aligning block B with their optical axes aligned. A reflection mirror assembly MA is rotatably provided on the aligning block B and driven by a driving means (motor) MO.

Figure 3:
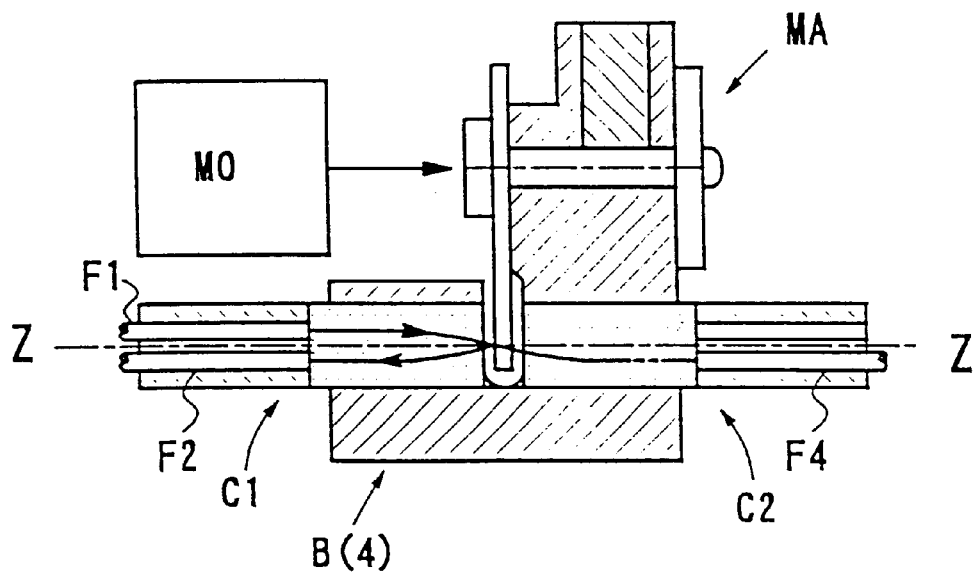
FIG. 3 is a schematic top plan view of an embodiment of a reflection mirror type 1×1 optical fiber switch in accordance with the present invention, wherein optical fibers $F_1$ and $F_2$ are in connection.
Figure 4:
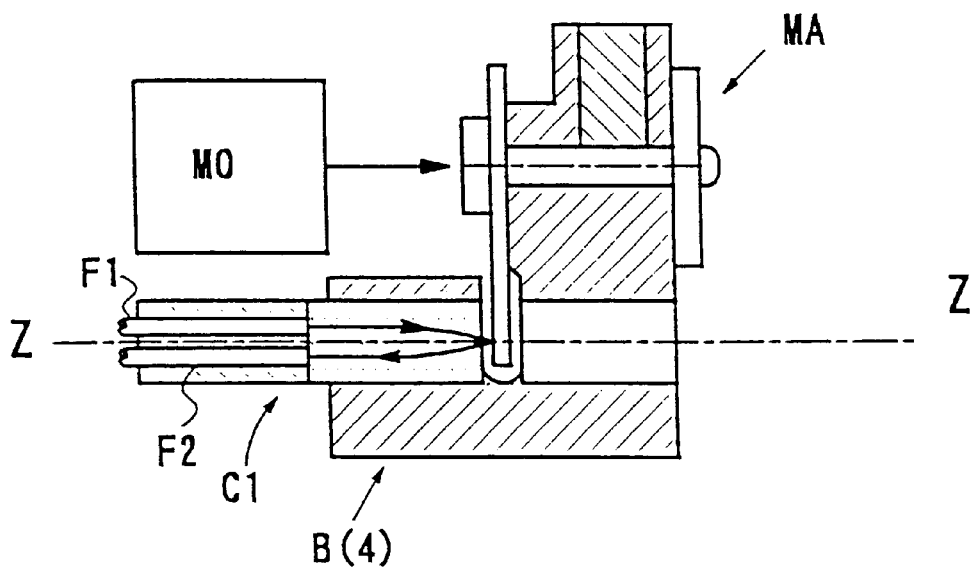
FIG. 4 illustrates a state wherein the optical fibers $F_1$ and $F_2$ are not in connection.

FIG. 3 is a schematic top plan view of an embodiment of a reflection mirror type 1×1 optical fiber switch in accordance with the present invention, wherein the optical fibers $F_1$ and $F_2$ are in connection. FIG. 4 illustrates a state wherein the optical fibers $F_1$ and $F_2$ are not in connection. Structurally, the state corresponds to a state wherein the collimator lens assembly $C_2$ of the foregoing embodiment has been removed.

Figure 5:
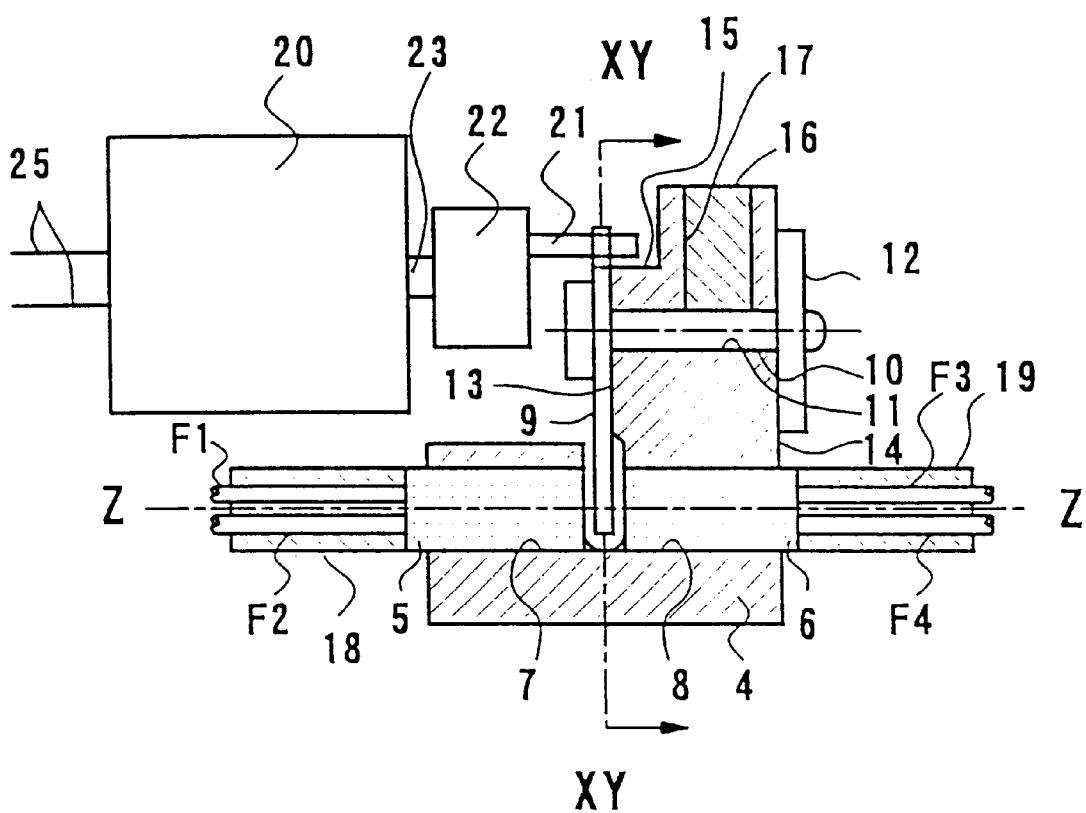
FIG. 5 is a top plan sectional view of the embodiment of the reflection mirror type 2×2 optical fiber switch in accordance with the present invention, wherein the optical fibers $F_1$ and $F_2$ are in connection, and $F_3$ and $F_4$ are in connection.
Figure 6:
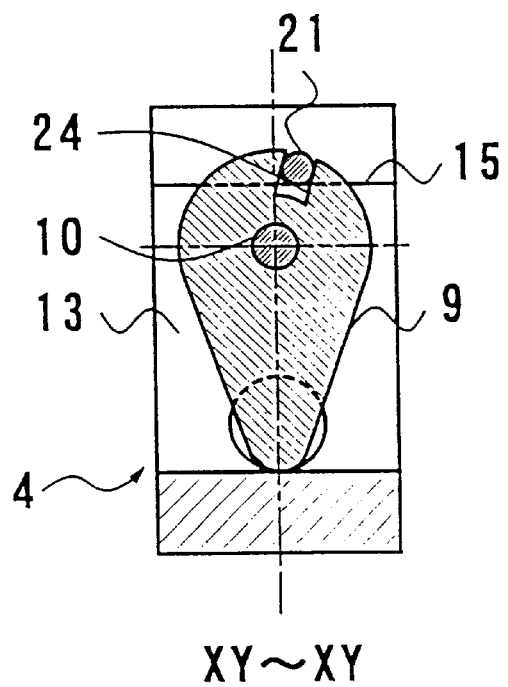
FIG. 6 is a side sectional view illustrating the foregoing embodiment in operation, the optical fibers $F_1$ and $F_2$ being in connection, and $F_3$ and $F_4$ being in connection.
Figure 7:
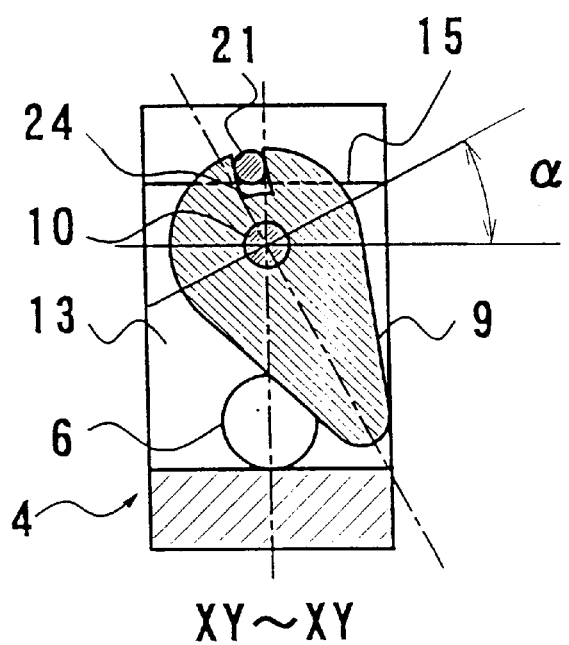
FIG. 7 is a side sectional view illustrating the foregoing embodiment in operation, the optical fibers $F_1$ and $F_4$ being in connection, and $F_2$ and $F_3$ being in connection.
Figure 8:
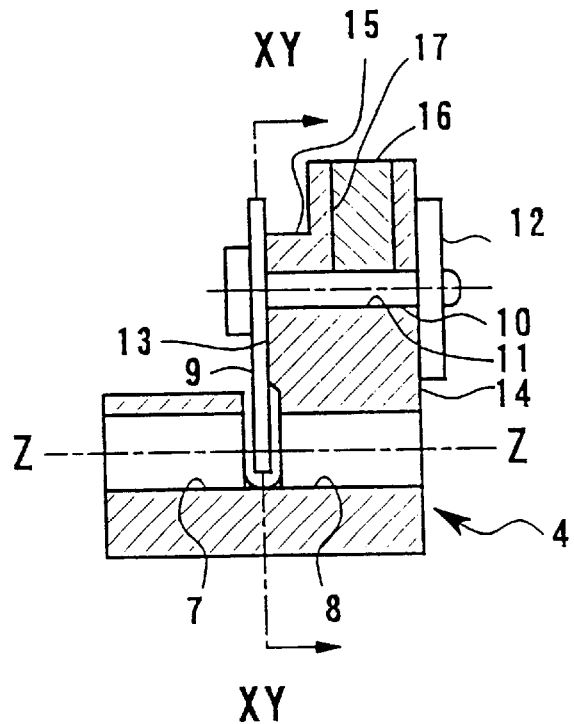
FIG. 8 is a top plan sectional view illustrating an aligning block used in the foregoing embodiment, and a reflection mirror assembly attached to the block.
Figure 9:
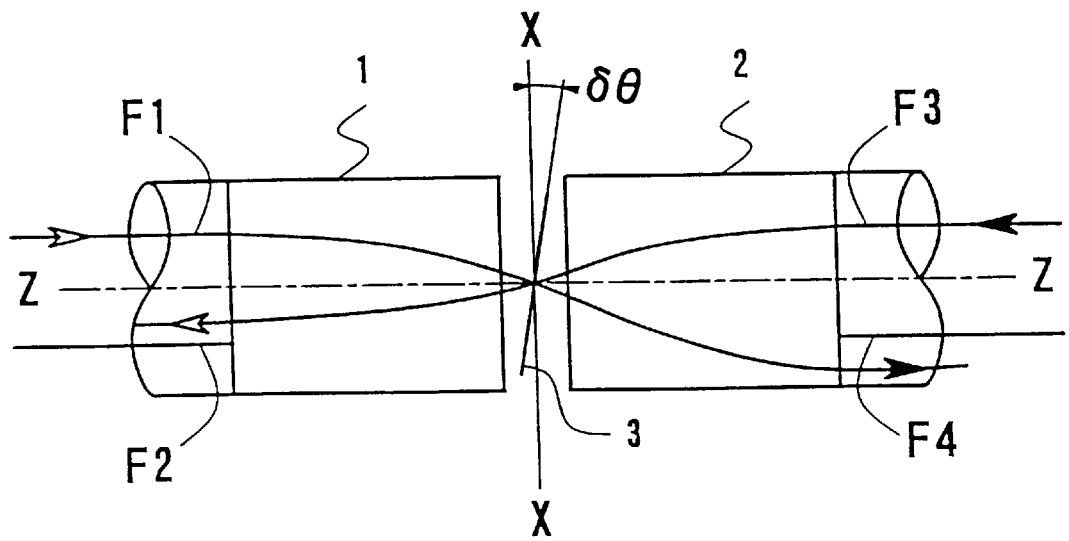
FIG. 9 is a schematic diagram illustrating influences of a tilt of a reflection mirror of the reflection mirror assembly.
Figure 10:
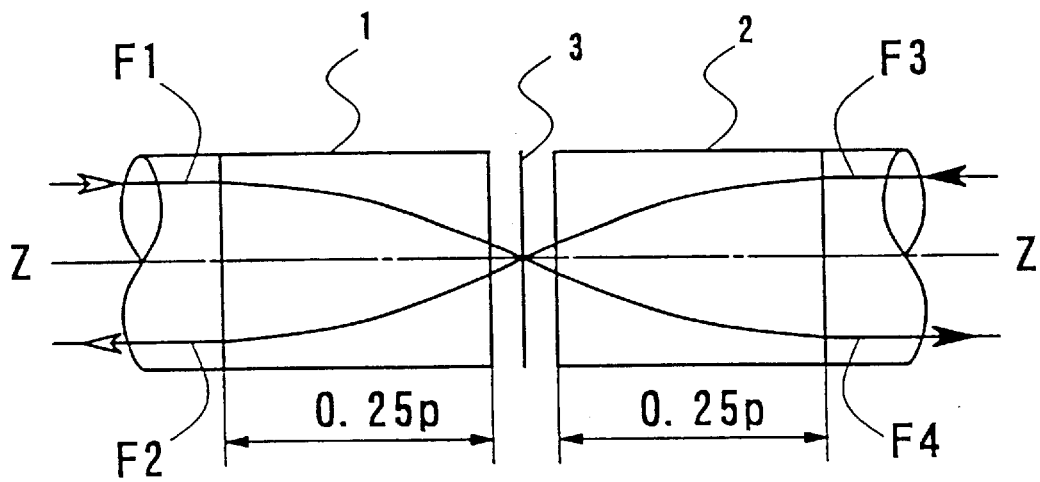
FIG. 10 is a schematic diagram showing a conventional reflection mirror type optical fiber switch.
Figure 11:
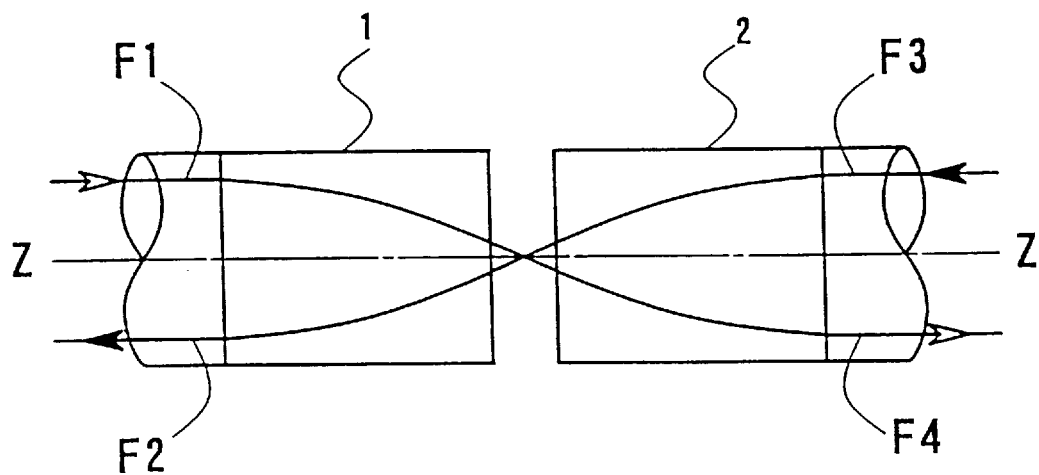
FIG. 11 is a schematic diagram showing another operational state of the conventional reflection mirror type optical fiber switch.

Referring mainly to the accompanying drawings, the embodiments of the reflection mirror type optical fiber switch in accordance with the present invention will be described in further detail. FIG. 5 is a partially cut away top plan view of an embodiment of a reflection mirror type 2×2 optical fiber switch in accordance with the present invention; FIG. 6 is a side sectional view of the embodiment in a certain operation mode; FIG. 7 is a side sectional view illustrating the foregoing embodiment in another operation mode; and FIG. 8 is a top plan sectional view illustrating a reflection mirror 9 attached to an aligning block 4.

The aligning block 4 is provided with holes 7 and 8 that are coaxially formed for mounting rod lenses 5 and 6 in a horizontal direction or a ZZ direction of an optical axis. Furthermore, an inserting hole 11 of a rotating shaft 10 of a reflection mirror 9 is horizontally formed in the aligning block 4. Parallel alignment reference planes or XY planes 13 and 14 that guide the reflection mirror 9 and a flange 12 in close contact therewith in a vertical direction or at right angles to the ZZ direction of the optical axis are provided perpendicularly to the inserting hole 11 of the rotating shaft 10 of the reflection mirror 9. The aligning block 4 is further provided with a swing rotational angle restricting surface 15 for the reflection mirror 9, and a hole 17 for burying, in contact with the rotating shaft 10, a permanent magnet 16 for preventing slight movement of the reflection mirror 9.

The optical fibers $F_1$ and $F_2$ are provided on a first ferrule 18 so that they are symmetrically positioned with respect to a central axis of the ferrule. An end face of the ferrule 18 is centered with one end face of the rod lens 5 and the end faces are bonded with an optical adhesive agent to fabricate the first collimator lens assembly $C_1$. Similarly, the optical fibers $F_3$ and $F_4$ are mounted on a second ferrule 19 so that they are symmetrically positioned with respect to a central axis of the ferrule. An end face of the ferrule 19 is centered with one end face of the rod lens 6, and the end faces are bonded with an optical adhesive agent to fabricate the second collimator lens assembly $C_2$.

The reflection mirror 9 and the flange 12 are secured to the rotating shaft 10 by laser spot welding or metal soldering. A motor 20 is a DC micro motor having an outside diameter of 7 mm, to which electric power is supplied via a feeder line 25. A bushing 22 provided with an eccentric pin 21 is coupled to a rotating shaft 23 of the motor 20. The eccentric pin 21 is engaged with a notch 24 provided in the reflection mirror 9. To improve its durability and reflectivity, the reflection mirror 9 uses stainless steel or other similar metal as its material. Both surfaces of the reflection mirror 9 are provided with Ti—N coating of a hardness of MHv 1800 or more and polished to mirror surfaces of having surface roughness of about 5 nm. Furthermore, the polished surfaces are coated with a film having high reflectivity, such as gold (Au) or platinum (Pt), by sputtering or chemical plating.

FIG. 8 is an assembly structure diagram illustrating a reflection mirror 9 of the reflection mirror type optical fiber switch in accordance with the present invention shown in FIG. 5 through FIG. 7, the reflection mirror 9 having been installed to the aligning block 4 beforehand.

As previously mentioned, the optical insertion loss of the reflection mirror type optical fiber switch heavily depends on the squareness accuracy of a surface of the reflection mirror 9 with respect to the optical axis ZZ of the rod lenses 5 and 6 when the reflection mirror 9 is inserted between the surfaces of the rod lenses. A solution to this problem is a major object of the present invention. As the solution, the reflection mirror type optical fiber switch is provided with a retaining device for swinging the reflection mirror 9 at right angles to the optical axis ZZ. As the retaining mechanism, two aligning reference planes 13 and 14 parallel to the right angle of an optical axis (XY) are provided on the aligning block 4 as shown in FIG. 8.

The aligning block 4 is manufactured by precision machining, so that a squareness accuracy error and a parallelism accuracy error of the aligning reference planes 13 and 14 in relation to the mounting holes 7 and 8 can be restricted to 0.001 mm or less for each 5 mm length. This value corresponds to tan 0.011° in terms of an angle. A calculated value of the optical insertion loss in this case under the same conditions previously mentioned will be about 0.053 dB or less. Even after other cumulative errors are included, it is possible to fabricate a reflection mirror type optical fiber switch for a single-mode optical fiber having maximum optical insertion loss of 1.0 dB.

Repeatability of squareness accuracy of a surface of the reflection mirror 9 with respect to the optical axis ZZ of the rod lenses 5 and 6 when the reflection mirror 9 is inserted between the end faces of the rod lenses 5 and 6 must be strictly secured. For this reason, the reflection mirror assembly is installed according to a procedure described below.

1) The rotating shaft 10 is inserted in the inserting hole of the reflection mirror 9 and further inserted, from an end of the aligning reference plane 13, in the hole 11 formed in the aligning block. Then, positioning is performed so that one end of the reflection mirror 9 is located at the rod lens mounting holes 7 and 8, and the reflection mirror 9 is formed integrally with the rotating shaft 10 by laser spot welding or metal soldering while pressing the reflection mirror 9 against the aligning reference plane 13 into close contact.

2) Next, with the reflection mirror 9 in close contact with the aligning reference plane 13, the flange 12 is inserted into the rotating shaft 10, and the flange 12 is integrally formed with the rotating shaft 10 by laser spot welding or metal soldering while pressing the flange 12 against the aligning reference plane 14 on the opposite side into close contact. The reflection mirror assembly and the aligning block 4 are assembled into one piece beforehand according to the above procedure, then the collimator lens assemblies $C_1$ and $C_2$ are inserted into the mounting holes 7 and 8, respectively to complete the assembly.

A driving mechanism of the embodiment will now be described. As previously mentioned, the bushing 22 provided with the eccentric pin 21 is coupled to the rotating shaft 23 of the motor 20, and the mirror assembly is operated as the motor 20 runs. A DC micro motor 20 of an outside diameter of 7 mm or less that has a magnetically closed circuit is used as the motor 20 in this embodiment. Using the motor 20 as the drive source for the reflection mirror 9 minimizes chances of malfunction caused by external magnetic induction that has been a problem with the conventional device. Since the motor 20 is small as previously mentioned, a height of an entire assembly can be reduced to 8.5 mm or less. Thus, the switch according to the embodiment can be used as a reflection mirror type optical fiber switch to be mounted on a ½ inch printed circuit board.

A braking mechanism for the mirror assembly of the embodiment will now be described. The mirror assembly is subjected to a braking force from a force generated by friction between a commutator and a brush of the DC micro motor 20. In this embodiment, the rotating shaft 10 of the mirror assembly further has a permanent magnet 16 installed at right angles to the shaft 10 so as to apply attracting force to the rotating shaft 10 of the reflection mirror 9. The motor 20 is energized to rotate the shaft by a predetermined angle, then the attraction force is applied thereto to prevent occurrence of unnecessary bounds or the like. In other words, making use of the attracting force of the permanent magnet has achieved a latching or self-holding reflection mirror type optical fiber switch that does not constantly require supply of current.

Although not shown, the braking mechanism provides the same advantage when the permanent magnet is buried axially parallel around the rotating shaft 10 of the reflection mirror 9, and the flange 12 formed of a magnetic material is used to attract the flange for applying a braking force.

An operation of the first embodiment of the reflection mirror type 2×2 optical fiber switch in accordance with the present invention that is assembled and configured as set forth above will now be described.

FIG. 6 shows a state wherein the micro motor 20 has been rotated clockwise by α degrees until the eccentric pin 21 comes in contact with the swing angle restricting surface 15 and stops, and the reflection mirror 9 has been inserted between the surfaces of the rod lenses 5 and 6. In this case, outgoing beams emitted from the optical fibers $F_1$ and $F_3$ can be reflected by the reflection mirror 9 so that they enter the optical fibers $F_2$ and $F_4$.

FIG. 7 shows a state wherein the micro motor 20 has been inversely rotated counterclockwise by α degrees until the eccentric pin 21 comes in contact with the swing angle restricting surface 15 and stops, and the reflection mirror 9 has been removed from between the surfaces of the rod lenses 5 and 6. In this case, outgoing beams emitted from the optical fibers $F_1$ and $F_3$ directly enter the optical fibers $F_4$ and $F_2$ since the reflection mirror 9 has been removed from between the rod lenses 5 and 6.

Thus, the optical switching operation for alternately switching the optical fiber $F_1$ circuit between the optical fiber circuit $F_1$ and the optical fiber $F_4$ circuit can be accomplished by inserting or removing the reflection mirror 9 into or from a gap between the rod lenses 5 and 6. Likewise, an optical switching operation of the 2×2 circuit for switching the optical fiber $F_3$ circuit between the optical fiber $F_3$ circuit and the $F_2$ optical fiber circuit can be accomplished.

If the optical fiber $F_3$ is not used, then a reflection mirror type 1×2 optical fiber switch can be constructed as shown in FIG. 3.

In the first collimator lens assembly $C_1$, a pair of optical fibers $F_1$ and $F_2$ is disposed in parallel symmetrically with respect to an optical axis of the lens, with a predetermined gap d being maintained therebetween. In the second collimator lens assembly $C_2$, a single optical fiber $F_4$ is disposed in parallel to an optical axis of the lens, with a gap d/2 from the optical axis being maintained. In the aligning block B, the first and second collimator lens assemblies are opposed to each other with their optical axes aligned, and supported so that the optical fiber $F_1$ and the optical fiber $F_4$ are optically coupled.

A reflection mirror assembly MA is constructed by: a reflection mirror shaft rotatably installed in a shaft hole provided in parallel to an optical axis of the lens in the aligning block B; a reflection mirror provided on the reflection mirror shaft so that the reflection mirror can move between a first position where the reflection mirror reflects light from the optical fibers to focal surfaces of the lenses at right angles to the optical axes of the lenses, and a second position where the reflection mirror causes the light from the optical fibers to directly enter the focal surfaces of the lenses; and a guiding means for defining a squareness of the reflection mirror at the first position by using the aligning block as a reference. The reflection mirror assembly MA is driven by a driving means.

In this case, when the reflection mirror 9 is set between the rod lenses 5 and 6, light emitted from the optical fiber $F_1$ enters the optical fiber $F_2$, while the light enters the optical fiber $F_4$ in the case of absence of the reflection mirror 9 between the rod lenses 5 and 6. Hence, moving or removing the reflection mirror 9 into or from the gap between the rod lenses 5 and 6 makes it possible to perform the optical switching operation of the 1×2 circuit for switching the optical fiber $F_1$ circuit between the optical fiber $F_2$ circuit and the optical fiber $F_4$ circuit.

If the collimator lens assembly $C_2$ is not used, then an optical switch of a 1×1 circuit for coupling or decoupling the optical fiber $F_1$ circuit to or from the optical fiber $F_2$ can be configured, as shown in FIG. 4. The collimator lens assembly $C_1$ is formed by a pair of the optical fibers $F_1$ and $F_2$ disposed symmetrically with respect to the optical axis of the lens. The reflection mirror is set at a focal position of the lens and moved between a first position for making connection from one optical fiber to another optical fiber, and a second position where the reflection mirror is retracted from the focal position. The aligning block B supports the collimator lens assembly $C_1$ and the reflection mirror assembly MA.

A defining means includes the aligning reference planes 13 and 14 on the aligning block B. The reflection mirror assembly MA is rotatably mounted to the aligning block B. The shaft hole 11 which receives the shaft 10 of the reflection mirror assembly MA is provided in parallel to the optical axis of the lenses 5 and 6. By the defining means, the surface plane of the reflection mirror 9 is kept to the right angle against the optical axis at the first position.

Obviously, the retaining mechanism of the reflection mirror of the reflection mirror type optical fiber switch in accordance with the present invention constructed as described above features a reduced insertion loss, stable repeatability, and resistance to influences of external forces, such as vibrations and shocks. Moreover, the DC micro motor 20 of an outside diameter of 7 mm or less that has a magnetically closed circuit is used to provide the drive source of the reflection mirror 9 that minimizes chances of malfunction caused by external magnetic induction. In addition, the height of the package can be reduced to 8.5 mm or less, making it possible to fabricate a reflection mirror type optical fiber switch that can be mounted on a ½ inch printed circuit board.

Furthermore, utilizing the force of friction between the commutator and the brush of the DC micro motor 20 and the attracting force of the permanent magnet 16 acting on the rotating shaft 10 of the reflection mirror 9 makes it possible to accomplish a latching or self-holding reflection mirror type optical fiber switch that does not constantly require energization.

What is claimed is:

1. A reflection mirror optical fiber switch comprising:
    a first collimator lens assembly ($C_1$) having a pair of optical fibers ($F_1$) and ($F_2$) disposed symmetrically with respect to an optical axis of a lens;
    a second collimator lens assembly ($C_2$) having a pair of optical fibers ($F_3$) and ($F_4$) disposed symmetrically with respect to an optical axis of a lens;
    an aligning block (B) in which the first and second collimator lens assemblies are opposed each other with their optical axes aligned, and supported so that the optical fiber ($F_1$) and the optical fiber ($F_4$) are optically coupled and the optical fiber ($F_2$) and the optical fiber ($F_3$) are optically coupled;
    a reflection mirror assembly formed by a reflection mirror shaft rotatably installed in a shaft hole provided in parallel to an optical axis of the lens in the aligning block, a reflection mirror provided on the reflection mirror shaft so that the reflection mirror can move between a first position where the reflection mirror reflects light from the optical fibers to focal surfaces of the lenses at right angles to the optical axes of the lenses and a second position where the reflection mirror causes the light from the optical fibers to directly enter the focal surfaces of the lenses, and defining means for defining a position of the reflection mirror at the first position by using the aligning block as a reference; and
    driving means for driving the reflection mirror.

2. A reflection mirror optical fiber switch according to claim 1, wherein each of the first and second collimator lens assemblies is formed of a pair of optical fibers, a ferrule supporting the optical fibers, and a rod lens of about 0.25 pitch which is coupled to the optical fibers and an end of the ferrule.

3. A reflection mirror optical fiber switch according to claim 1, wherein the driving means employs a micro motor wherein a portion to be engaged with the reflection mirror assembly is provided in an end of a rotating shaft.

4. A reflection mirror optical fiber switch according to claim 1, wherein the reflection mirror uses a metal as a material thereof, and both surfaces of the metal are provided with Ti—N coating of a hardness of MHv 1800 or more and coated with a film having high reflectivity by sputtering or chemical plating.

5. The reflection mirror optical fiber switch according to claim 4, wherein the film having a high reflectivity is one of gold (Au) and platinum (Pt).

6. The reflection mirror optical fiber switch according to claim 4, wherein the metal of the reflection mirror is stainless steal.

7. A reflection mirror optical fiber switch according to claim 1, wherein a permanent magnet in the vicinity of or in contact with the rotating shaft of the reflection mirror is buried in the aligning block to provide a self-holding mechanism at an end of a rotational angle of the reflection mirror.

8. A reflection mirror optical fiber switch according to claim 1, wherein the defining means is formed by a plane formed at right angles to an optical axis of the lens mounted on the aligning block, and a reflection mirror or a flange that rotates in slidable contact with the plane.

9. A reflection mirror 1×2 optical fiber switch comprising:
    a first collimator lens assembly ($C_1$) in which a pair of optical fibers ($F_1$) and ($F_2$) is disposed in parallel symmetrically with respect to an optical axis of a lens, with a predetermined gap (d) being maintained therebetween;

a second collimator lens assembly ($C_2$) in which a single optical fiber ($F_4$) is disposed in parallel to an optical axis of a lens, with a gap (d/2) from the optical axis being maintained;

an aligning block (B) in which the first and second collimator lens assemblies are opposed to each other with their optical axes aligned, and supported so that the optical fiber ($F_1$) and the optical fiber ($F_4$) are optically coupled;

a reflection mirror assembly formed by a reflection mirror shaft rotatably installed in a shaft hole provided in parallel to an optical axis of the lens in the aligning block, a reflection mirror provided on the reflection mirror shaft so that the reflection mirror can move between a first position where the reflection mirror reflects light from the optical fibers to focal surfaces of the lenses at right angles to the optical axes of the lenses, and a second position where the reflection mirror causes the light from the optical fibers to directly enter the focal surfaces of the lenses, and defining means for defining a position of the reflection mirror at the first position by using the aligning block as a reference; and driving means for driving the reflection mirror.

10. In a reflection mirror optical fiber switch having a collimator lens assembly formed by a pair of the optical fibers disposed symmetrically with respect to an optical axis of a lens, and a reflection mirror set at a focal position of the lens and moved between a first position for making connection from one optical fiber to another optical fiber, and a second position where the reflection mirror is retracted from the focal position;

a reflection mirror 1×1 optical fiber switch comprising:

an aligning block supporting the collimator lens assembly and the reflection mirror;

a reflection mirror assembly formed by a reflection mirror shaft rotatably installed in a shaft hole provided in the block in parallel to the optical axis of the lens, a reflection mirror provided on the reflection mirror shaft and extended to or retracted from image forming surfaces of the optical fibers at right angles to the optical axes of the lenses, and defining means for defining position of the reflection mirror at the first position based on the aligning block; and driving means for driving the reflection mirror.

* * * * *